2,974,067

HYDROLYSIS OF VEGETABLE CELLULOSIC MATERIALS

Alfons Apel, Mannheim, Germany, assignor to Udic Societe Anonyme, Vevey, Switzerland No Drawing. Filed Feb. 11, 1958, Ser. No. 714,509

3 Claims. (Cl. 127—37)

The invention relates to the hydrolysis of vegetable cellulosic materials.

In my copending application Ser. No. 702,270, filed December 12, 1957, for "Selective Saccharification of Cellulosic Materials," I have disclosed a two step hydrochloric acid saccharification method, where the cellulosic material is first treated at a temperature of about 15 to 30° C. with hydrochloric acid of about 29 to 37 percent by weight of HCl dissolved in a lower aliphatic alcohol so as to obtain pentoses, and where the residue of said prehydrolysis is then hydrolyzed with 38–42% HCl to obtain hexoses.

My further investigations have shown that the saccharification of wood and similar substances with alcoholic solutions of hydrogen chloride can be used to obtain, in addition to sugar solutions, substantially pure lignin and cellulose.

According to the invention, wood, cotton stems, bagasse, and the like are treated at room temperatures of about 15 to 30° C. with an alcoholic solution containing about 38–42, preferably about 40% by weight of hydrogen chloride. In such treatment, the sugars and the lignin are dissolved, and almost pure cellulose is obtained as a residue. By adding water to the solution, the lignin is precipitated and can be filtered off. The filtrate is then evaporated, whereby the solvent and hydrogen chloride are recovered. The distillation residue is diluted with water to an about 10 to 15 percent sugar solution, in order to split the polymer sugars formed by repolymerisation; the solution is then heated for a short time, for instance ½ hour, at boiling temperature, and is then freed from the residual salts and acids, for instance by means of conventional cationic and anionic ion exchange resins. After decoloration with a suitable resin, a clear very pure sugar solution is obtained.

The residue of the alcoholic hydrochloric acid hydrolysis is a solid white product, which consists essentially of pure cellulose, which can be either saccharified with high concentrated hydrochloric acid or used for other purposes.

My method eliminates the need for expensive hydrolysis apparatus; if the mixture of cellulosic materials and alcoholic hydrochloric acid is allowed to stand at room temperature for a sufficient period of time, for instance 12 hours, the hydrolysis and extraction take place. Stirring shortens the reaction time; if the hydrolysis is carried out countercurrently, a higher concentration of the sugars and lignin is obtained, which increases the yield per unit of volume and time.

Particular advantages of the method are the ready recovery of the solvent and hydrogen chloride, and the simple separation of the lignin. The remaining cellulose is so pure that in the conventional main hydrolysis with aqueous hydrochloric acid of about 41% HCl at 20° C. a sugar is obtained which contains not more than about 2 percent of pentoses.

When alcoholic hydrochloric acid solutions are employed which contain considerably higher HCl concentration than 40 percent, very strong reactions take place which do no longer allow the use of simple apparatus.

As solvent, I prefer methanol, but other lower aliphatic alcohols such as ethanol and propanols may also be used.

The following examples illustrate the method of the invention. All parts are given by weight.

*Example 1*

103 parts of bagasse (100 parts of dry material) are placed in 800 parts of an anhydrous methanolic solution of hydrogen chloride (40% HCl; $d.=1.009$) and allowed to stand for a period of 12 hours at a temperature of 20 to 30° C. The solid residue is filtered, washed with methanol, and dried. 46.9 parts of 98% cellulose are thus obtained.

The filtrate and wash methanol are combined, and water is added in an amount sufficient to precipitate the lignin. The required amount is determined in samples of the filtrate which are diluted with water until no further lignin is precipitated. After filtration and drying, 16.1 parts of dry lignin are obtained.

The filtrate is fractionated under reduced pressure and the distilled methanol and hydrogen chloride are recovered by condensation. The residue is diluted with water, to a sugar concentration of about 15 percent, and the solution is afterhydrolyzed by heating at boiling temperature. A liquor is obtained which contains 28.8 parts of sugar, calculated as glucose, which can be recovered in the crystalline state by conventional procedures.

100 parts of dry bagasse yield
46.9 parts of cellulose (98%)
28.8 parts of sugar
16.1 parts of lignin

*Example 2*

103 parts of beech wood saw dust (100 parts of dry substance) are treated as set forth in Example 1. There are obtained 51.9 parts of cellulose (90%)
23.9 parts of sugar
23.0 parts of lignin

*Example 3*

103 parts of saw dust obtained from young pines (100 parts of dry substance; average grain size 1 mm.) are placed in the lower part of a column and a 40% HCl solution in anhydrous methanol ($d.=1.009$) is fed into the upper part of the column. A worm conveyor passes the sawdust upwardly in countercurrent to the solvent. The reaction is terminated after 5 hours, and there are obtained 49.5 parts of cellulose (95%)
23.4 parts of sugar
23.9 parts of lignin

I claim:
1. A method of hydrolyzing cellulosic lignin-containing materials comprising treating said materials at a temperature of about 15 to 30° C. with a hydrochloric acid solution of about 38 to 42 percent by weight of HCl in a substantially anhydrous aliphatic alcohol containing 1 to 3 C atoms, thereby obtaining essentially pure cellulose and a solution of sugars and lignin, separating said solution from the cellulose, diluting the solution with water to precipitate the lignin, heating the lignin-free solution to evaporate the alcohol and hydrochloric acid, and recovering the sugars remaining in the residue from said evaporation.

2. The method as defined in claim 1 wherein sawdust is used as cellulosic material.

3. The method as defined in claim 1 wherein methanol containing about 40% by weight of HCl is used as solvent.

References Cited in the file of this patent

UNITED STATES PATENTS

| | | |
|---|---|---|
| 1,795,166 | Farber | Mar. 3, 1931 |
| 1,919,623 | Dreyfus | July 25, 1933 |
| 1,963,972 | Freyfus | June 26, 1934 |
| 1,964,646 | Finningley | June 26, 1934 |
| 2,465,347 | Boehm et al. | Mar. 29, 1949 |
| 2,526,607 | Kurth | Oct. 17, 1950 |